Figure 1:
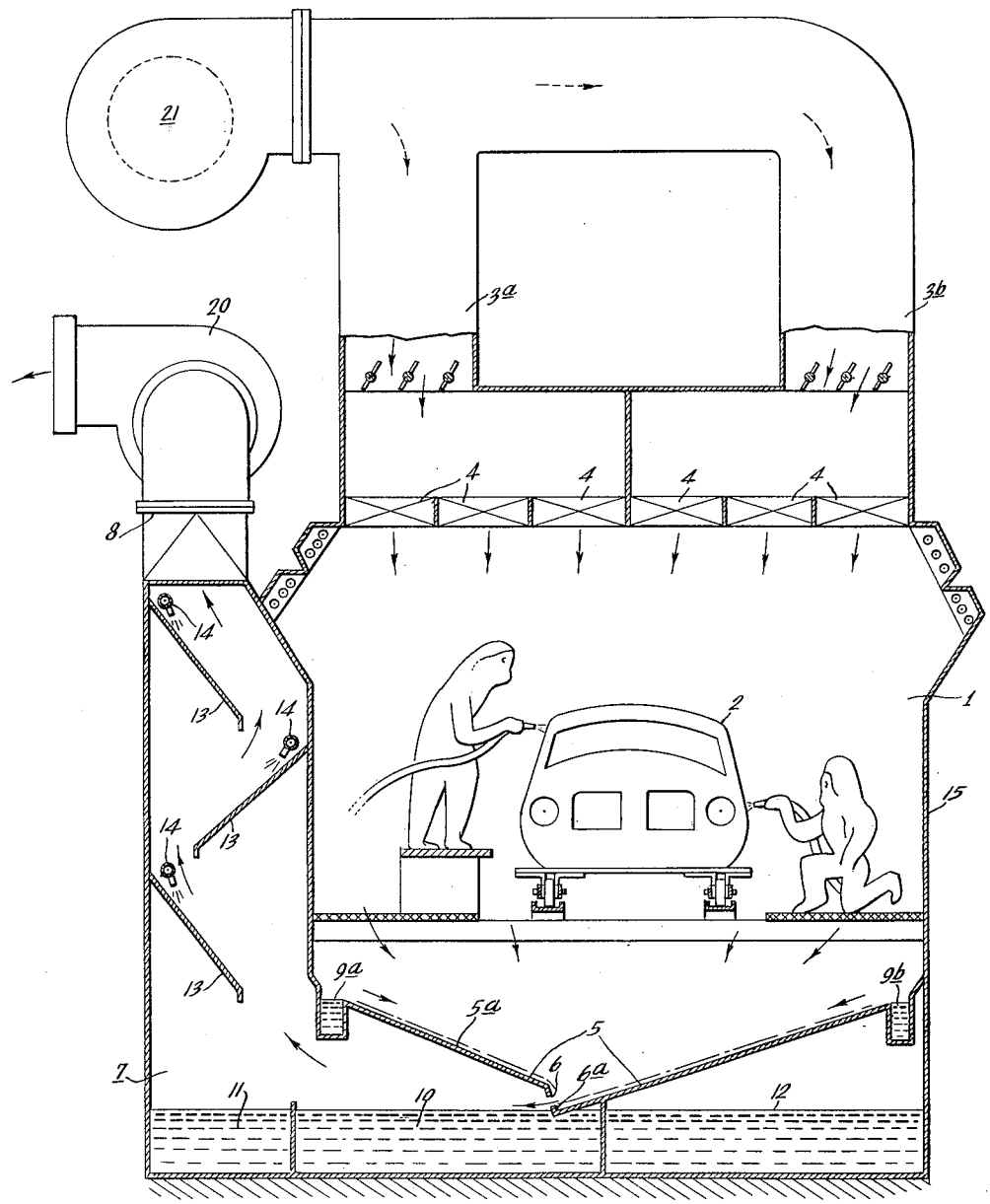

Feb. 2, 1965  G. WILHELMSSON ETAL  3,168,030
ARRANGEMENT IN SPRAY-PAINTING CHANNELS
Filed Dec. 20, 1962  2 Sheets-Sheet 1

INVENTORS:
GUNNAR WILHELMSSON
ÅKE ARBORGH
JAN SJÖGREN
BY Howson & Howson
ATTYS.

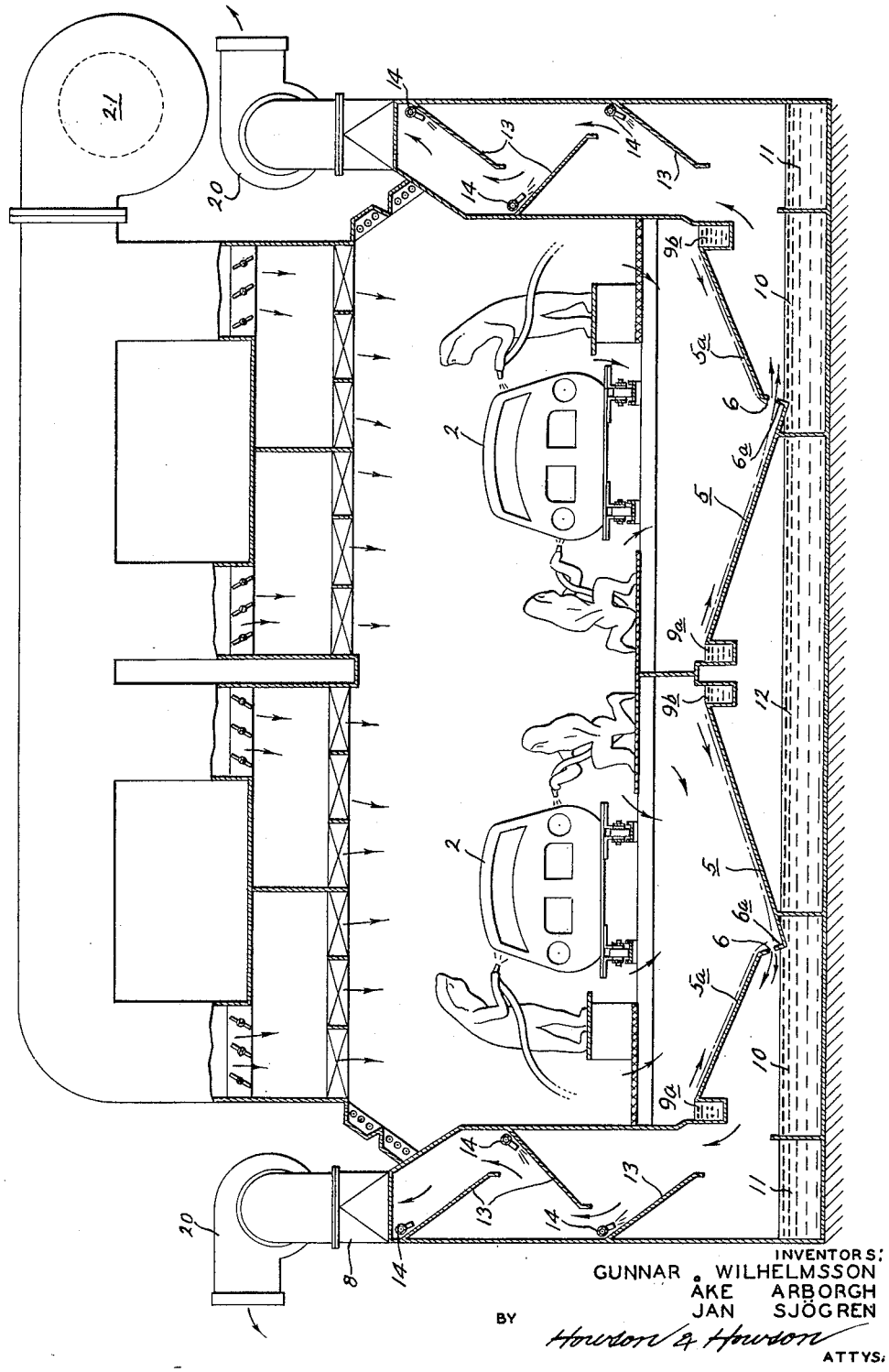

United States Patent Office 3,168,030
Patented Feb. 2, 1965

3,168,030
ARRANGEMENT IN SPRAY-PAINTING CHANNELS
Gunnar Wilhelmsson, Smalands Taberg, Åke Arborgh, Jonkoping, and Jan Sjögren, Nacka, Sweden, assignors to Aktiebolaget Svenska Fläktfabriken, Stockholm, Sweden
Filed Dec. 20, 1962, Ser. No. 246,159
Claims priority, application Sweden, Dec. 22, 1961, 12,898/61
2 Claims. (Cl. 98—115)

This invention relates to improvements in plants through which objects are conveyed in a continuous or intermittent manner for spray-painting therein.

Typically, such plants comprise channels having V-shaped bottom walls which terminate in a constricted longitudinal opening for discharging ventilating air supplied to the channel and adapted to sweep across the objects as they are painted. Directly beneath the channel, and in communication therewith, is a drop separator substantially the same length as the channel. Along the inner walls of the channel, liquid supply means introduce cleaning liquid into the channel in such a manner that the liquid sweeps over the V-shaped bottom walls in the form of a covering liquid film. This covering liquid film prevents paint from sticking to the walls and mixes with the ventilating air at the constricted longitudinal opening thereby atomizing the liquid and causing agglomeration of the paint particles. Ventilating air suction means are disposed at one end of a tortuous path in the drop separator causing the agglomerated paint and atomized liquid laden air to move towards the suction means. The air and agglomerated paint and atomized liquid are then separated by passing through the tortuous path, the heavier particles falling into disposal means for either separation of the paint from the liquid (if it is desirable to reuse the liquid) or disposal of the liquid and paint mixture.

In certain cases, particularly when modernizing already existing spray-painting plants, it has been found that limitations, especially with reference to plant height, make conventional plant designs, as heretofore described, impracticable.

With the foregoing in mind, it is an object of the present invention to provide a spray painting plant operable in accordance with the principles enunciated in the second paragraph above but with a novel structural design which permits the plant to be constructed in less space but with as great a capacity as plants of greater height.

In order that the height of the plant could be decreased while maintaining the same size and object capacity channel, and at the same time to maintain the efficiency in the atomization of the liquid and agglomeration of the paint particles, it was discovered that the constricted longitudinal opening could be redirected crosswise of the channel. In accordance with the invention the bottom of the channel is shaped so that the aforesaid opening is directed towards an outlet shaft located to the side of the channel and serving as drop separator. Further, in accordance with another embodiment of the invention, where an increased capacity plant is desired, the bottom of the channel is provided with two oppositely turned openings each of which is directed towards one of two outlet shafts located on both sides of the channel and serving as drip separators.

Other objects and a fuller understanding of the invention may be had by referring to the following description and claims taken in conjunction with the accompanying drawings in which:

FIG. 1 is a cross section through a spray-painting plant embodying the present invention; and FIG. 2 is a cross section through a greater capacity spray-painting plant embodying the present invention.

Referring now to FIGURE 1, 1 designates a closed channel through which objects 2 are conveyed for spray-painting. Heated ventilating air which may be pre-filtered is supplied by air supply means 21 through ducts 3a and 3b and distributed uniformly across the entire horizontal cross-section of the channel by means of air filters 4 laid into the channel roof. The channel has a pair of substantially V-shaped bottom walls 5. One of the bottom walls, in the present instance wall 5, terminates in an upstanding side wall 6a, while the other wall, in the present instance 5a, terminates short of the upstanding side wall 6a thus defining a constricted opening 6 for discharging the ventilating air. The constricted opening 6 directs the ventilating air directly into a drop separator 7 which has substantially the same length as the channel and is at one end 8 connected to suction means 20 which draws the air through a tortuous path (not shown).

From troughs 9a and 9b respectively, cleaning liquid is supplied in such a manner that it sweeps over the V-shaped bottom walls 5 in the form of a covering liquid film. The constricted opening 6 is shaped such that it gives the outflowing air sufficient velocity to atomize the liquid. The liquid is injected into the air stream substantially transverse of the air stream to cause atomization of the liquid and agglomeration of the paint particles which fail to adhere to the objects being painted, and therefore wash with the liquid down the walls, or are entrained within the air flow. In accordance with the invention the constricted opening 6 causes the mixture of air, liquid and paint particles to be injected towards a side wall, thus utilizing the liquid in a liquid basin 10, located beneath the opening, and the underside of the sloping side wall 5a as the sides of a diverging venturi.

As the mixture is deflected sideways it comes into contact with the surface of the cleaning liquid in a basin 10, and with the liquid surface in an outlet groove 11 located at the bottom of the drip separator 7. The larger paint particles entrained in the mixture, because of their weight, will precipitate directly into the liquid, while the remaining paint particles by repeated collision with the liquid particles will agglomerate in such a manner that thereafter they will be effectively separated in the drip separator. The outlet groove 11 leads to a water cleaning tank 12 which may be located adjacent the liquid basin 10 beneath a portion of the channel or at any other suitable location as desired. In the vertically oriented chute portion of the drop separator 7, there are mounted a plurality of oblique baffle plates 13 for effecting a tortuous path for the paint, water and air mixture. The oblique baffle plates provide repeated deflection of the outflowing mixture and cause precipitation of the paint particles and liquid moving with the air. At the baffle plates it is often desirable to provide separate liquid supply means 14 for rinsing the baffle plates thereby preventing undesirable accumulations of paint particles thereon.

Ofttimes it is desirable to provide a greater capacity spray paint plant without increasing the height of the plant. To this end, and as indicated in FIG. 2, the side wall 15 of the plant shown in FIG. 1 may be removed and a mirror image of that plant added to allow double the capacity of the plant shown in FIG. 1. Thus in accordance with the invention, a double constricted opening will appear in plants constructed in accordance with the foregoing.

Although the invention has been described with a certain degree of particularity, it is understood that the present disclosure has been made only by way of example and that numerous changes in the details of construction and the combination and arrangement of parts

What we claim is:

1. A plant for spray-painting and the like comprising a channel having a pair of longitudinally extending, spaced side walls, and a pair of substantially V-shaped bottom walls depending from said side walls, air supply means disposed along the upper portion of said channel and adapted to provide a flow of air across objects being painted in said channel, one of said bottom walls terminating in an upwardly projecting portion substantially perpendicular to said one bottom wall, the other of said walls terminating short of said end portion but aligned therewith so as to define a constricted, slot-shaped opening, liquid supply means positioned along the upper portion of each of said V-shaped bottom walls and adapted to supply a covering liquid film over said walls, means for exhausting the ventilating air through said slot so that as ventilating air supplied by said air supply means, and laden with paint particles after sweeping across the objects being painted, passes through said constricted opening, said liquid is mixed into said ventilating air thereby atomizing said liquid and entraining paint particles therein.

2. A plant for spray-painting and the like according to claim 1 including a drop separator comprising a basin underlying said constricted opening and adapted to contain a supply of said liquid at a level adjacent said opening, a chute interconnecting said exhaust means and said basin and including inwardly projecting baffle plates mounted in said chute and positioned and dimensioned to provide a tortuous path for said ventilating air between said exhaust means and said opening, said baffles affecting separation of said ventilating air from said liquid in which paint particles are entrained.

References Cited by the Examiner

UNITED STATES PATENTS 2,086,514    7/37    Saunders _____ 98—115

R. A. O'LEARY, *Primary Examiner.*